United States Patent
Choi

(10) Patent No.: US 12,141,276 B2
(45) Date of Patent: Nov. 12, 2024

(54) METHOD OF BLOCKING ACCESS OF THREATENING USER AND PROGRAM SECURITY APPLICATION METHOD

(71) Applicant: LOCK-IN COMPANY CO., LTD., Gyeonggi-do (KR)

(72) Inventor: Myoung Kyu Choi, Gyeonggi-do (KR)

(73) Assignee: LOCK-IN COMPANY CO., LTD., Gyeonggi-Do (KR)

( * ) Notice: Subject to any disclaimer, the term of this patent is extended or adjusted under 35 U.S.C. 154(b) by 460 days.

(21) Appl. No.: 17/310,927

(22) PCT Filed: Apr. 28, 2020

(86) PCT No.: PCT/KR2020/095079
§ 371 (c)(1),
(2) Date: Aug. 31, 2021

(87) PCT Pub. No.: WO2021/221266
PCT Pub. Date: Nov. 4, 2021

(65) Prior Publication Data
US 2022/0327205 A1 Oct. 13, 2022

(30) Foreign Application Priority Data
Apr. 28, 2020 (KR) .................. 10-2020-0051621
Apr. 28, 2020 (KR) .................. 10-2020-0051623

(51) Int. Cl.
*G06F 21/55* (2013.01)
(52) U.S. Cl.
CPC ...... *G06F 21/554* (2013.01); *G06F 2221/031* (2013.01)

(58) Field of Classification Search
CPC ... G06F 21/554; G06F 2221/031; G06F 21/31
See application file for complete search history.

(56) References Cited

U.S. PATENT DOCUMENTS

| 2014/0150049 A1* | 5/2014 | Kwon | H04W 4/50 726/1 |
| 2015/0121449 A1* | 4/2015 | Cp | G06F 21/566 726/1 |
| 2019/0036926 A1* | 1/2019 | Isola | H04L 63/1425 |

FOREIGN PATENT DOCUMENTS

JP 2017033199 A 2/2017

OTHER PUBLICATIONS

Office Action from JP2021-550107 dated Aug. 30, 2022.

* cited by examiner

*Primary Examiner* — Beemnet W Dada
(74) *Attorney, Agent, or Firm* — Mark T. Vogelbacker; Eckert Seamans Cherin & Mellott, LLC

(57) ABSTRACT

A method of blocking access of a threatening user includes (a) executing an application on a user terminal, (b) collecting, by the user terminal, access information and transmitting the access information to a server unit, (c) determining, by the server unit, whether a user is a target whose access is to be blocked on the basis of the access information, (d) transmitting, by the server unit, a normal execution code or a blocking message to the user terminal according to a result of the determination, and (e) executing the user terminal according to the normal execution code or the blocking message.

10 Claims, 9 Drawing Sheets

| BLOCK BAD(OR DANGEROUS) USERS AUTOMATICALLY |
|---|
| Bad (or dangerous) users can be registered and blocking.<br>Enter the MAC address of bad (or dangerous) user and clink 'BLOCK' button to block.<br>To unblock, click 'Release Block' in the List of blocked users<br><br>MAC ADDRESS: [ 38:A4:ED:BE:FF:02 ]   [ 15 ] day(s) block   [ BLOCK ] |

FIG. 4

LIAPP PROTECTION RESULT

PROTECTION OPTIONS

| CODE_ENC: yuno | STRING ENCRYPTION | ANTI-REPACK | ANTI-DEBUG | ANTI-TAMPER | MEMORY PROTECTION | ROOTING |

Protection in now complete, Click the button below to save your file.
You can the history and information of your apps protection for the last 3 days and downloadable links in the HISTORY page After Your app protected by LIAPP you must add the signing certificate and zipalign that is used for publishing.
[Make sign and zipalign run commands]

1. jarsigner-verbose-sigalg SHA1withRSA-digestalgSHA1-keystore
[Keystore File Path][App Path][alias_name made when you created key]

C:\ >jarsigner-verbose-sigalgSHA1withRSA-digestalgSHA1-keystore C:\ my-release-key.keystore C:\ LIAPP.apk LOCKINCOMPANY 2. Enter password 3. zipalign-f-v 4 'target.apk' 'target_zipalign.apk'
[zipalign Option][zipalign Target File Path][zipalign Output File Path]

DOWNLOAD

FIG. 9

METHOD OF BLOCKING ACCESS OF THREATENING USER AND PROGRAM SECURITY APPLICATION METHOD

CROSS-REFERENCE TO RELATED APPLICATION

This application is a National Phase Application of International Application No. PCT/KR2020/095079, filed Apr. 28, 2020, which claims priority to and the benefit of Korean Patent Application No. 10-2020-0051621, filed on Apr. 28, 2020, and Korean Patent Application No. 10-2020-0051623, filed Apr. 28, 2020, the disclosures of which are incorporated herein by reference in their entirety.

TECHNICAL FIELD

The present invention relates to a method of blocking access of a threatening user and a program security application method, and more particularly, to a method of blocking access of a threatening user which fundamentally blocks access of the threatening user and allows an administrator to make a setting for blocking and a program security application method for increasing a processing rate by extracting a class without a program decompiling and compiling process.

BACKGROUND ART

With the development of the electronic field, various devices are recently becoming electronic and being digitized, and hardware devices operated by software programs are gradually increasing accordingly.

A representative one of the hardware devices is a computer. On a computer, an operating system is installed, and various applications are installed and run as separate programs. Such a computer encompasses not only a personal computer, such as a desktop computer, but also a communication terminal such as a smart phone.

However, as applications programmed by software are widely used like this, program hacking is becoming a major problem.

In general, hacking refers to all actions of illegally accessing a vulnerable security network of a computer network and having a detrimental effect on an operation of an information system or a specific terminal. As a result, hacking refers to causing an application to operate in a way that the developer did not intend by manipulating the program code at the hacker's will.

An example of such program hacking is illegally copying program code so as to distribute the application to a large number of unauthenticated people or manipulating program code to perform a function wanted by an application hacker.

Such program hacking violates developers' copyrights or has strong harmful effects on overall systems on which applications are run, and thus program hacking is emerging as an important problem which can never be ignored or overlooked.

Accordingly, security experts are developing security solutions for preventing program hacking. Various security solutions are under development, such as accessing an authentication server to perform a user authentication procedure or verifying the integrity of program code.

Program developers add such security solutions to programs so as to protect the program code of applications against hacking.

However, with the technological development of security solution programs, hacking technology for attempting access through the above security is becoming intelligent and advanced. Accordingly, there is a need for a technology to effectively block hacking threatening users.

Also, companies which provide the above security solution programs according to the conventional art generally provide information of a list of threatening users (i.e., hackers). Accordingly, it is difficult for an administrator who receives the security solution program to apply a threatening user list stored in the administrator in a customized manner.

Further, according to the conventional method of applying a security solution to a program for this, a developer adds security solution code in person in the middle of program code during a program development step.

However, according to the conventional method, a problem of compatibility occurs between program code and security solution code, and various errors occur in a process of adding security solution code to program code. Moreover, in the case of updating a program, it is necessary to recheck both updated program code and security solution code, which is troublesome.

RELATED ART DOCUMENTS (Patent Literature 1) Korean Patent Publication No. 10-1583545 (Jan. 4, 2016) (Patent Literature 2) Korean Patent Publication No. 10-1420383 (Jul. 10, 2014)

DISCLOSURE

Technical Problem

The present invention is directed to providing a method of blocking access of a threatening user in which a server unit determines whether a user is a target whose access is to be blocked on the basis of access information collected from a user terminal and transmits a normal execution code or a blocking message to the user terminal.

The present invention is also directed to providing a method of blocking access of a threatening user in which an administrator sets a detection count in consideration of the number of threat detections counted by a server unit.

The present invention is also directed to providing a program security application method in which a server unit extracts app information from a file uploaded from a user terminal, executes a driving code extracted from the extracted app information in combination with a security execution code, and then tests the driving code to execute the original source code.

The technical objects of the present invention are not limited to those described above, and other technical objects which have not been described above may be clearly understood by those of ordinary skill in the art from the following descriptions.

Technical Solution

One aspect of the present invention provides a method of blocking access of a threatening user, the method including (a) executing an application on a user terminal, (b) collecting, by the user terminal, access information and transmitting the access information to a server unit, (c) determining, by the server unit, whether a user is a target whose access is to be blocked on the basis of the access information, (d) transmitting, by the server unit, a normal execution code or a blocking message to the user terminal according to a result of the determination, and (e) executing the user terminal according to the normal execution code or the blocking message.

Step (b) may include (b1) collecting the access information including information on the user terminal or information on a user who possesses the user terminal and (b2) transmitting the access information to the server unit.

Step (c) may include (c1) storing, by the server unit, the access information transmitted from the user terminal and (c2) determining, by the server unit, whether the user is a target whose access is to be blocked on the basis of the access information.

When it is determined in step (c2) that the user is the target whose access is to be blocked, (d) may be performed to transmit the blocking message.

When it is determined in step (c2) that the user is not the target whose access is to be blocked, step (c) may further include (c3) detecting, by the server unit, hacking threats, (c4) counting hacking threat detections, and (c5) determining whether the threat detection count is included in a preset access block value, and an administrator may set the preset access block value according to the threat detection count.

When the server unit detects no hacking threat in step (c5), step (d) may be performed to transmit the normal execution code.

When it is determined in step (c5) that the threat detection count is included in the preset access block value, step (d) may be performed to transmit the blocking message.

When it is determined in step (c5) that the threat detection count is not included in the preset access block value, step (d) may be performed to transmit the blocking message.

Step (d) may include (d1) transmitting, by the server unit, the blocking message to the user terminal and (d2) transmitting, by the server unit, the normal execution code to the user terminal.

Step (e) may include (e1) receiving, by the user terminal, the blocking message or the normal execution code from the server unit and (e2) determining whether the user terminal has received the normal execution code.

When it is determined in step (e2) that the user terminal has received the normal execution code, step (e) may further include (e3) allowing access of the user terminal.

When it is determined in step (e2) that the user terminal has not received the normal execution code, step (e) may further include (e4) outputting a threat detection message.

Another aspect of the present invention provides a program security application method including (A) uploading, by a user terminal, a file to a server unit, (B) extracting, by the server unit, app information on the basis of the file, (C) analyzing code in the app information to separate the code into an original source code and a driving code, (D) combining, by the server unit, a security execution code, which replaces the original source code, with the driving code, (E) executing, by a user client, the security execution code, and (F) executing, by the user client, the original source code.

Step (C) may include (C1) extracting, by the server unit, the code from the app information, (C2) analyzing, by the server unit, the code, and (C3) separating, by the server unit, the code into the original source code and the driving code.

Step (D) may include (D1) replacing, by the server unit, the original source code with the security execution code and (D2) combining, by the server unit, the original source code and the security execution code.

In step (D), the original source code replaced with the security execution code may be subjected to security processing through obfuscation and encryption.

The program security application method may further include, between steps (E) and (F), testing the user terminal after the security execution code is executed and decrypting the original source code or the security execution code.

In step (C), the original source code may be a code developed by a user, and the driving code may be a code which is not developed by the user.

In step (B), the app information may include at least one of package name information of an app, application information, activity information, service information, and listener information.

Advantageous Effects

According to the above-described configuration of the present invention, a server unit determines whether a user is a target whose access is to be blocked on the basis of access information collected from a user terminal and transmits a normal execution code or a blocking message to the user terminal. Accordingly, it is possible to fundamentally block access of a threatening user.

Also, according to the above-described configuration of the present invention, an administrator sets a detection count in consideration of the number of threat detections counted by a server unit. Accordingly, the administrator can actively participate in blocking a threatening user.

According to the above-described configuration of the present invention, a server unit separates an original source code and a driving code from app information and then executes the driving code in combination with a security execution code. Accordingly, a processing rate can be increased as compared to the conventional art.

Effects of the present invention are not limited to those described above and should be understood as including all effects which may be inferred from the configurations disclosed in the detailed description or claims of the present invention.

DESCRIPTION OF DRAWINGS

FIG. 4 is an exemplary view illustrating a setting window for manual blocking in the method of blocking access of a threatening user according to the embodiment of the present invention.

FIG. 9 is a view illustrating a result of applying the program security application method according to the embodiment of the present invention to protect a code and an app.

BEST MODE OF THE INVENTION

Figure 1:
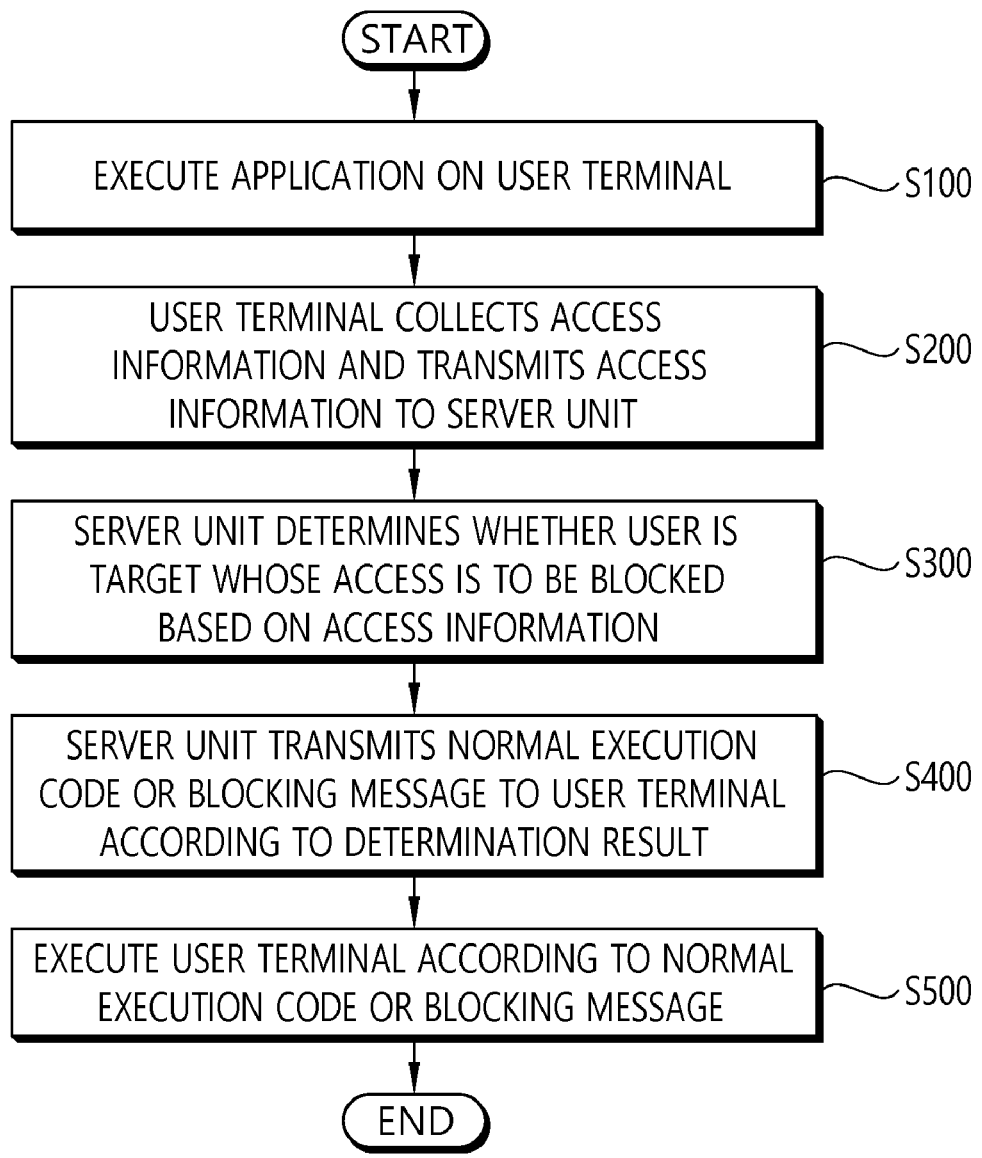
FIG. 1 is a flowchart illustrating a method of blocking access of a threatening user according to an embodiment of the present invention.

The present invention provides a method of blocking access of a threatening user, the method including (a) executing an application on a user terminal, (b) collecting, by the user terminal, access information and transmitting the access information to a server unit, (c) determining, by the server unit, whether a user is a target whose access is to be blocked on the basis of the access information, (d) transmitting, by the server unit, a normal execution code or a blocking message to the user terminal according to a result of the determination, and (e) executing the user terminal according to the normal execution code or the blocking message.

Modes of the Invention

Hereinafter, the present invention will be described with reference to the accompanying drawings. However, the present invention can be implemented in various different forms and is not limited to the embodiments described herein. In the drawings, parts unrelated to the description are omitted to clearly describe the present invention. Throughout the specification, like reference numerals refer to like parts.

Throughout the specification, when a part is referred to as "connected to (coupled to, in contact with, or combined with)" another part, this includes not only a case in which the parts are "directly connected to each other" but also a case in which the parts are "indirectly connected to each other" with another member therebetween. Also, when a part is referred to as "including" an element, unless specifically stated otherwise, this does not mean that other elements are excluded and means that other elements may be further included.

Terms used in the present specification are used to describe only specific embodiments and are not intended to limit the present invention. Singular forms are intended to include plural forms unless the context clearly indicates otherwise. It will be further understood that the terms "include," "have," and the like used herein specify the presence of features, numerals, steps, operations, elements, parts, or combinations thereof stated herein but do not preclude the probability of the presence or addition of one or more other features, numerals, steps, operations, elements, parts, or combinations thereof.

Hereinafter, embodiments of the present invention will be described in detail with reference to the accompanying drawings.

Figure 2:
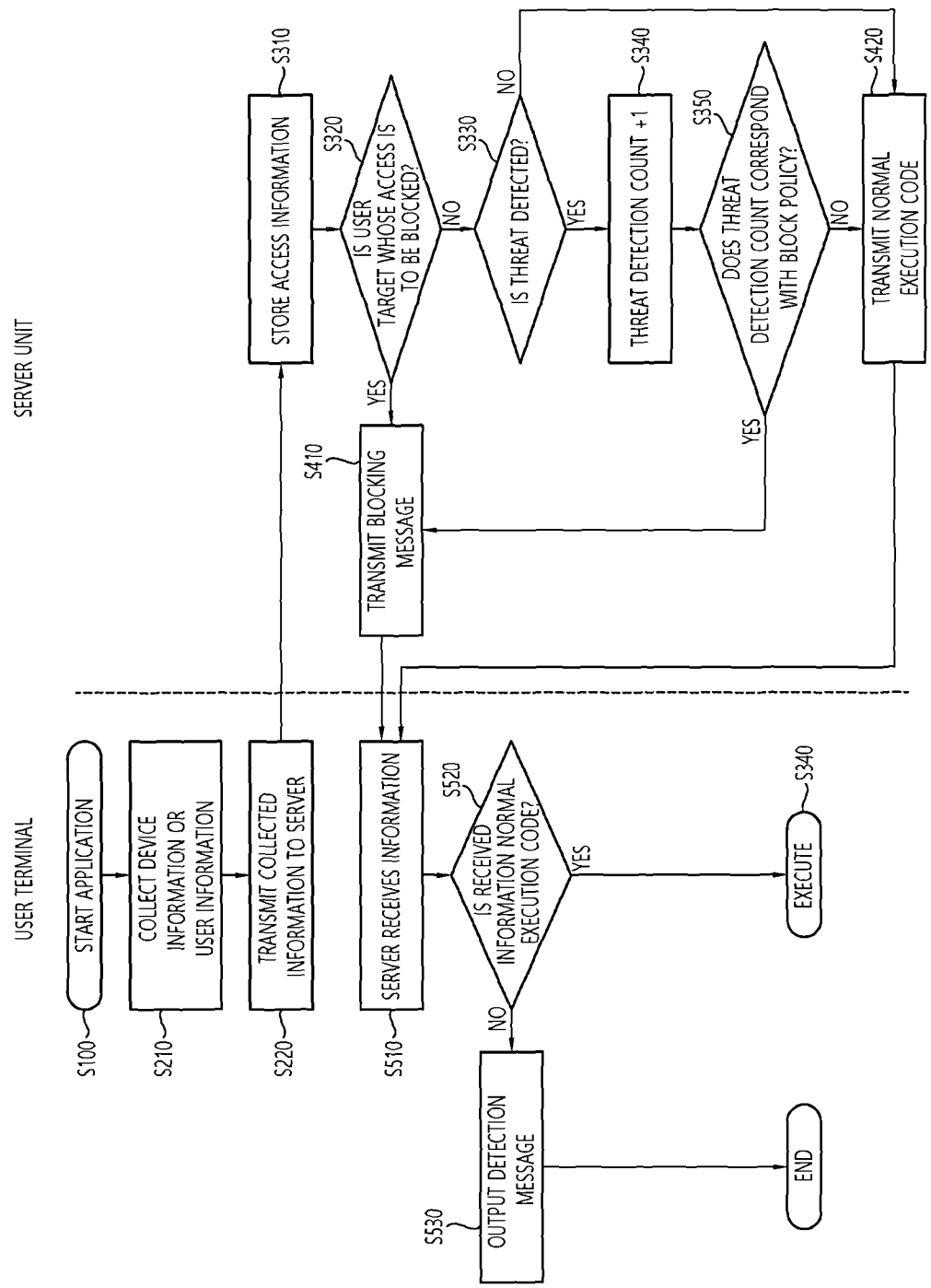
FIG. 2 is a flowchart illustrating detailed steps of the method of blocking access of a threatening user according to the embodiment of the present invention.

FIG. 1 is a flowchart illustrating a method of blocking access of a threatening user according to an embodiment of the present invention. FIG. 2 is a flowchart illustrating detailed steps of the method of blocking access of a threatening user according to the embodiment of the present invention.

The method of blocking access of a threatening user according to the embodiment of the present invention includes a step (a) in which an application is executed on a user terminal (S100), a step (b) in which the user terminal collects access information and transmits the access information to a server unit (S200), a step (c) in which the server unit determines whether a user is a target whose access is to be blocked (S300), a step (d) in which the server unit transmits a normal execution code or a blocking message to the user terminal according to a result of the determination, and a step (e) in which the user terminal is executed according to the normal execution code or the blocking message (S500).

Here, the access information is a unique value which is given to uniquely identify a user who uses a device or a service and may include at least one of information on a user terminal and information on a user who possesses the user terminal.

Access information including an identification value used for identifying each device may be derived from one of media access control (MAC), such as a service identity (ID) in the device or of a user, a hardware ID, a device ID, an advertisement ID, a chain, and a user identification code used in an app system (e.g., a game ID) or a combination of a plurality thereof.

Subsequently, the step (b) includes a step (b1) of collecting access information including information on the user terminal or a user who possesses the user terminal and a step (b2) of transmitting the access information to the server unit.

Subsequently, the step (c) includes a step (c1) in which the server unit stores the access information transmitted from the user terminal and a step (c2) in which the server unit determines whether the user is a target whose access is to be blocked on the basis of the access information.

When it is determined in the step (c2) that the user is a target whose access is to be blocked, the step (d) is performed to transmit the blocking message so that the user terminal may not access a corresponding website.

Figure 3:
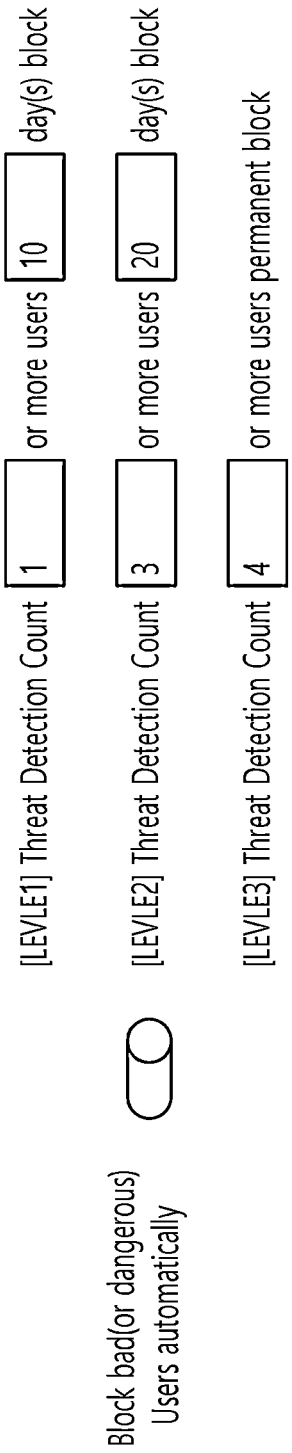
FIG. 3 is an exemplary view illustrating a setting window for automatic blocking in the method of blocking access of a threatening user according to the embodiment of the present invention.

FIG. 3 is an exemplary view illustrating a setting window for automatic blocking in the method of blocking access of a threatening user according to the embodiment of the present invention.

A program provided for the method of blocking access of a threatening user according to the present invention may be installed in an administrator (e.g., a website, such as Naver, Daum, or Google) in advance and may block an attempt to access the website when the target whose access is to be blocked makes the attempt.

On the contrary, when it is determined in the step (c2) that the user is not a target whose access is to be blocked, the step (c) further includes a step (c3) in which the server unit detects hacking threats, a step (c4) of counting hacking threat detections, and a step (c5) of determining whether the threat detection count is included in a preset access block value.

Here, the administrator may set the preset access block value according to the threat detection count. Specifically, after a threatening user list is internally made as a database, the administrator may set the preset access block value in consideration of the threat detection count provided by the server unit.

For example, after a threat detection count is received from the server unit, the administrator may examine the threat detection count and set the preset access block value to block three or more instances of access. The preset access block value can be set as a detection count or a range of detection counts.

In other words, according to a security program provided by the present invention, the server unit does not provide threatening user information, and the administrator receives information on a threat detection count and then arbitrarily sets a preset access block value in consideration of threatening user information managed in the administrator and transmits the preset access block value to the server unit.

To exclude or block the threatening user's access, the administrator may use automatic blocking. Specifically, the administrator may set blocking through an automatic blocking window so that the threatening user cannot access the website during an arbitrary time period when any threat is detected. The number of days during which access of the threatening user is blocked is determined according to the setting.

FIG. 4 is an exemplary view illustrating a setting window for manual blocking in the method of blocking access of a threatening user according to the embodiment of the present invention.

Subsequently, the manual blocking shown in FIG. 4 supports the administrator so that the administrator may input a unique identification value of the user terminal to a system and input a desired block period.

When the server unit detects no hacking threat in the step (c5), the step (d) is performed to transmit the normal execution code.

On the other hand, when it is determined in the step (c5) that the threat detection count is included in the preset access block value, the step (d) is performed to transmit the blocking message.

Meanwhile, when it is determined in the step (c5) that the threat detection count is not included in the preset access block value, the step (d) is performed to transmit the blocking message.

Subsequently, the step (d) includes a step (d1) in which the server unit transmits the blocking message to the user terminal and a step (d2) in which the server unit transmits the normal execution code to the user terminal.

Subsequently, the step (e) includes a step (e1) in which the user terminal receives the blocking message or the normal execution code from the server unit and a step (e2) of determining whether the user terminal has received the normal execution code.

When it is determined in the step (e2) that the user terminal has received the normal execution code, the step (e) may further include a step (e3) of allowing access of the user terminal.

When it is determined in the step (e2) that the user terminal has not received the normal execution code, the step (e) may further include a step (e4) of outputting a threat detection message. Accordingly, the user's access to the administrator is blocked.

Figure 5:
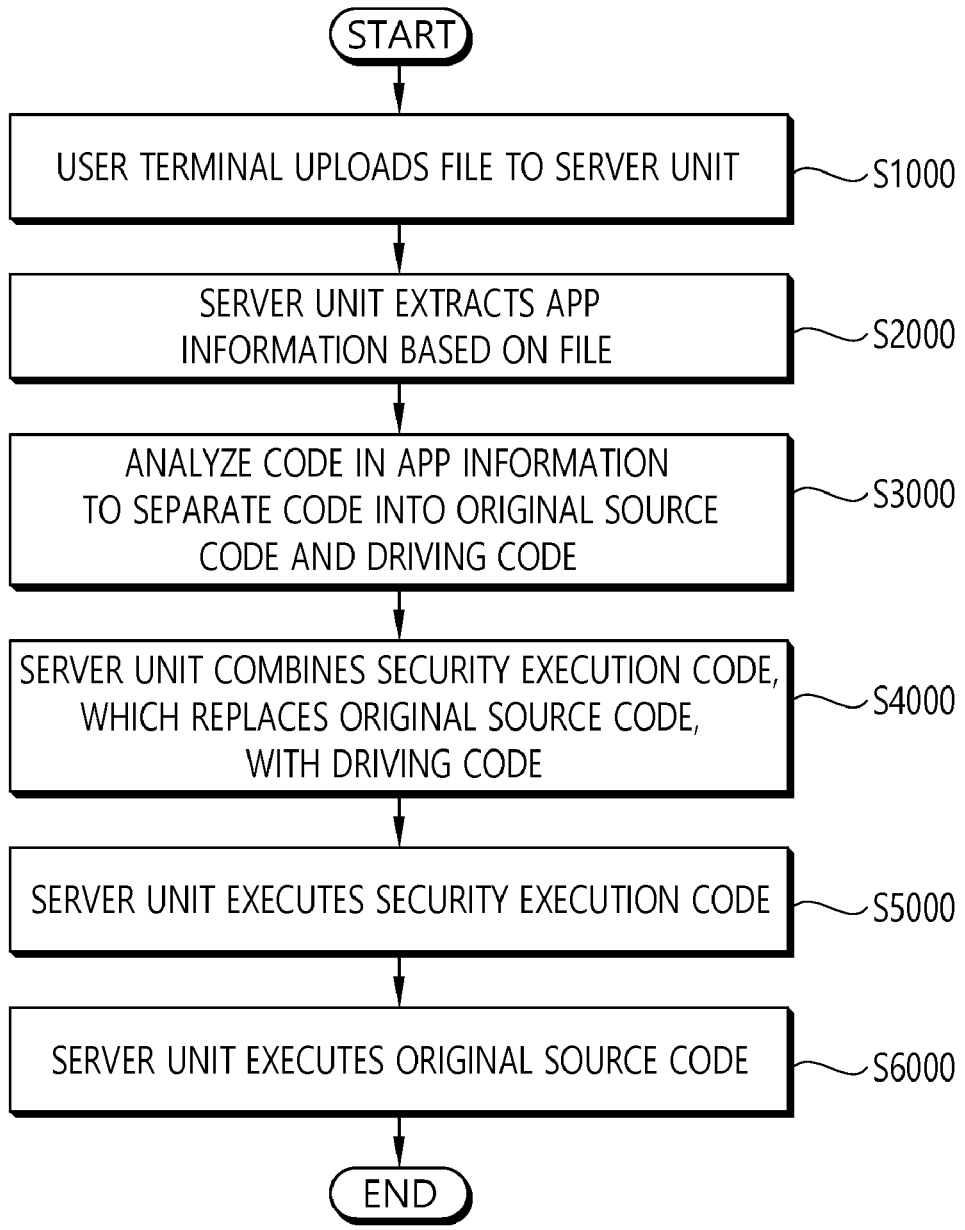
FIG. 5 is a flowchart illustrating a program security application method according to an embodiment of the present invention.

FIG. 5 is a flowchart illustrating a program security application method according to an embodiment of the present invention.

The program security application method according to the embodiment of the present invention includes a step (A) in which a user terminal uploads a file to a server unit (S1000), a step (B) in which the server unit extracts app information on the basis of the file (S2000), a step (C) of analyzing code in the app information to separate the code into an original source code and a driving code (S3000), a step (D) in which the server unit combines a security execution code, which replaces the original source code, with the driving code (S4000), a step (E) in which a user client executes the security execution code (S5000), and a step (F) in which the user client executes the original source code (S6000).

Here, the original source code may be a class. As an example, one driving code is described in the present invention, but the original source code may include a plurality of codes which perform different functions other than the driving code.

According to the conventional art, after all of an original source code, a driving code, and a plurality of codes are decompiled, a security code is applied to each of the codes, and then the codes are compiled back, which shows a considerably slow processing rate. On the contrary, according to the present invention, after an original code and a driving code are separated, a security execution code is only applied to the driving code, and decompiling is not performed, which shows a considerably high processing rate.

Also, since the security execution code includes a function of extracting identification information for identifying a mobile device, it is possible to block access of a threatening user.

In addition, the user client may be a mobile app system.

Figure 6:
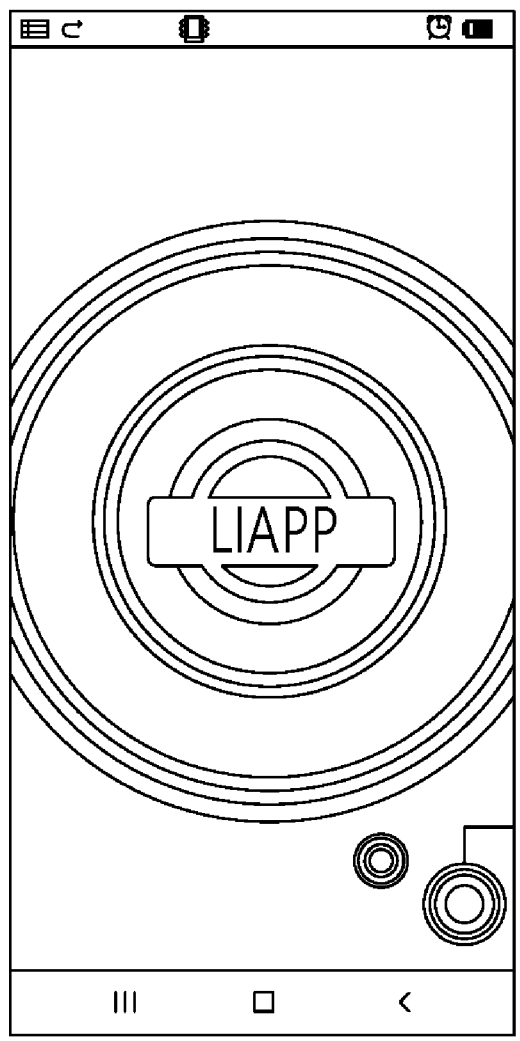
FIG. 6 is a view of an app being executed on a user terminal in the program security application method according to the embodiment of the present invention.
Figure 7:
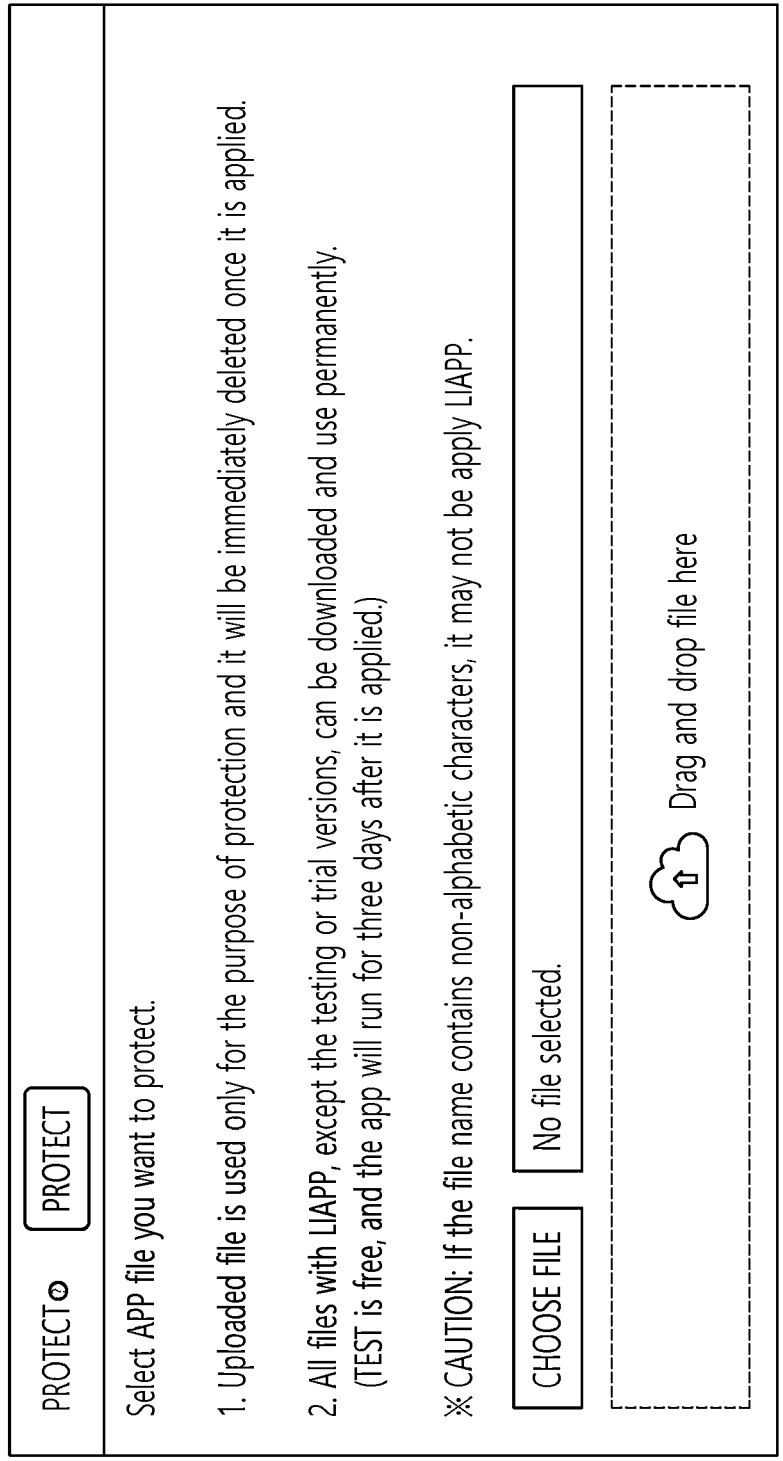
FIG. 7 is an exemplary view illustrating a process in which a user terminal uploads a file to a server unit in the program security application method according to the embodiment of the present invention.

FIG. 6 is a view of an app being executed on a user terminal in the program security application method according to the embodiment of the present invention. FIG. 7 is an exemplary view illustrating a process in which a user terminal uploads a file to a server unit in the program security application method according to the embodiment of the present invention.

In the step (A), the file is uploaded to the server unit. Here, the file may include access information, which may include at least one of information on the user terminal and information on a user who possesses the user terminal.

An app for applying security is executed on the user terminal as shown in FIG. 6, and the file is uploaded through a screen of the server unit shown in FIG. 7.

Access information including an identification value used for identifying each device may be derived from one of MAC, such as a service ID in the device or of a user, a hardware ID, a device ID, an advertisement ID, a chain, and a user identification code used in an app system (e.g., a game ID) or a combination of a plurality thereof.

In the step (B), the app information includes at least one of package name information of an app, application information, activity information, service information, and listener information.

The activity information is a component of a program and is a source code for implementing a unit service in which the program is provided.

Specifically, an activity is a source code configured to generate and control a screen output to the user. For example, an activity is a source code which is written to generate and control a user input screen, a game information output screen, and the like.

A listener is a network administrator for connecting the client to the server unit, and such a listener is executed to allow access of clients.

Specifically, a plurality of listeners may be configured and executed as necessary, and each listener may register a service list dynamically or manually.

A listener which uses a basic port also registers information on a dispatcher which is being executed from a process monitor (PMON). However, a service of a listener which does not use the basic port (another listener which changes a local listener setting) is not dynamically registered.

The service information is information on a program or routine which supports another program in a computer, particularly at a low level close to hardware.

Figure 8:
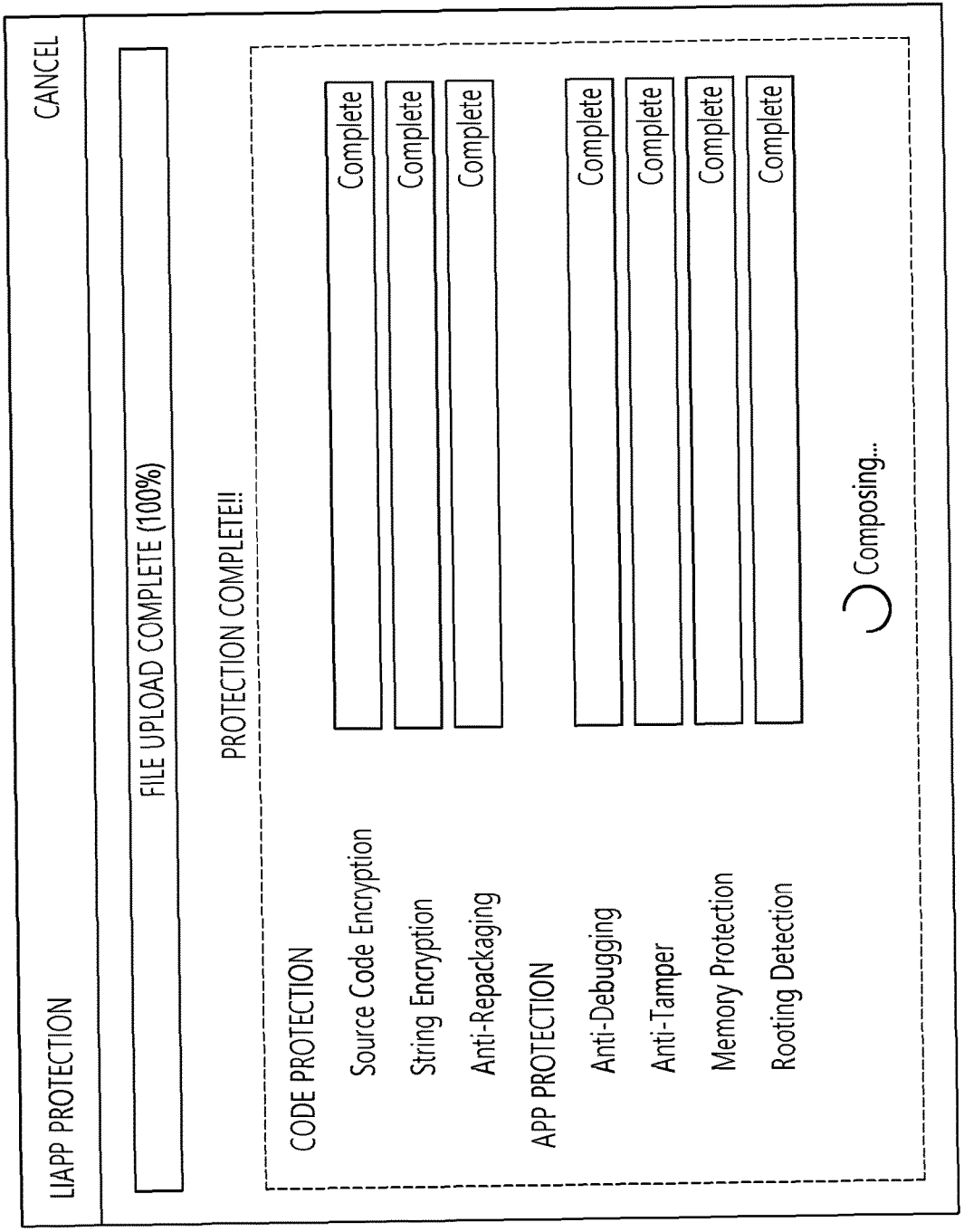
FIG. 8 is a view illustrating a process for protecting a code and an app in the program security application method according to the embodiment of the present invention.

FIG. 8 is a view illustrating a process for protecting a code and an app in the program security application method according to the embodiment of the present invention.

The step (C) includes a step (C1) in which the server unit extracts the code from the app information, a step (C2) in which the server unit analyzes the code, and a step (C3) in which the server unit separates the code into the original source code and the driving code.

In the step (C), the original source code is a code developed by the user, and the driving code is a code not developed by the user.

As shown in FIG. 8, in the step (C1), a process for protecting a code and an app may be performed, and the original source code, the driving code, and various other codes may be extracted through the above process.

In the step (C1), the code may include the original source code and the driving code described above. In addition, in the step (C1), the code is extracted from any one of the package name information of the app, the application information, the activity information, the service information, and the listener information. There may be various codes according to functions.

In the step (C2), the server unit analyzes the code extracted in the step (C1).

In the step (C3), the server unit separates the code into the original source code and the driving code.

According to the present invention, through the step (C), it is possible to solve the problem of the conventional art in which a processing rate is lowered because a program is decompiled to generate a program code, a security code is combined with the program code, and the program code is compiled back.

In other words, according to the present invention, classes are separated without a process of decompiling and compiling a program. Accordingly, the present invention has a considerably higher processing rate than the conventional art.

Subsequently, the step (D) includes a step (D1) in which the server unit replaces the original source code with the security execution code and a step (D2) in which the server unit combines the original source code and the security execution code.

Specifically, the security execution code may be placed at a position where the original source code has been, and the original source code replaced by the security execution code may be subjected to security processing through obfuscation and encryption and stored at a specific position.

FIG. 9 is a view illustrating a result of applying the program security application method according to the embodiment of the present invention to protect a code and an app.

The step (E) (S5000) is a step in which the server unit executes the security execution code. Before executing the original source code, the server unit first checks the safety of the user terminal.

A resultant screen of the step (E) is shown in FIG. 9.

To this end, between the step (E) and the step (F), the present invention may include a step of checking the user terminal and a step of decrypting the original source code or the security execution code after the security execution code is executed.

After the security source code is executed, the user terminal is checked, and when the check result is determined that the user terminal is safe, the security source code is converted into the original source code through decryption and other tasks.

Meanwhile, after the security source code is executed, the user terminal is checked, and when the check result is determined that the user terminal is unsafe, the process may be terminated or return to the step (S2000).

Finally, in the step (F), after the user terminal is determined to be safe, the server unit executes the original source code.

According to the above description of the present invention, as an application protector which prevents the leakage of a company's core technology and safely protects intellectual property rights against hacking and illegal tampering, the present invention can be applied to all applications running on mobile devices (Android and iOS). In this way, the present invention blocks any hacking which threatens mobile applications and blocks all situations of suffering from financial damage and protects major assets of applications.

The present invention is a fusion of an application threat detection technology, an application protector technology, and an anti-hacking solution technology. These technologies are not simply added together but are organically combined without overlap and collision therebetween so that individual functions cover each other's vulnerabilities and perform efficient operations. Also, the present invention can be used from payment to security application at a time in a software as a service (SaaS) manner.

In terms of application method, the user's convenience is maximized by the SaaS manner without additional work of the developer. By simply uploading a file, it is possible to block all hacking actions, such as source code protection, memory tampering, and real-time debugging, and provide all security functions required for mobile applications such as game engine protection, virtual machine detection, repackaging prevention, and tampering prevention functions.

The above description of the present invention is illustrative, and those of ordinary skill in the art will appreciate that the present invention can be easily modified in other specific forms without changing the technical spirit or essential characteristics thereof. Therefore, it should be understood that the embodiments described above are exemplary in all aspects and not restrictive. For example, each element described as a single type can be implemented in a distributed manner, and similarly, elements described to be in a distributed manner can be implemented in a combined form.

It should be construed that the scope of the present invention is represented by the following claims, and all changes or modifications derived from the meaning and scope of the claims and equivalents thereof fall within the scope of the present invention.

The invention claimed is:

1. A method of blocking access of a threatening user, the method comprising:
   (a) executing an application on a user terminal;
   (b) collecting, by the user terminal, access information and transmitting the access information to a server unit;
   (c) determining, by the server unit, whether a user is a target whose access is to be blocked on the basis of the access information, wherein step (c) comprises:
      (c1) storing, by the server unit, the access information transmitted from the user terminal; and
      (c2) determining, by the server unit, whether the user is a target whose access is to be blocked on the basis of the access information, and wherein when it is determined in step (c2) that the user is not the target whose access is to be blocked, step (c) further comprises:
      (c3) detecting, by the server unit, hacking threats;
      (c4) counting hacking threat detections; and
      (c5) determining whether a threat detection count is included in a preset access block value, and
      an administrator sets the preset access block value according to the threat detection count;

(d) transmitting, by the server unit, a normal execution code or a blocking message to the user terminal according to a result of the determination; and (e) executing the user terminal according to the normal execution code or the blocking message.

2. The method of claim 1, wherein step (b) comprises:

(b1) collecting the access information including information on the user terminal or information on a user who possesses the user terminal; and (b2) transmitting the access information to the server unit.

3. The method of claim 1, wherein, when it is determined in step (c2) that the user is the target whose access is to be blocked, step (d) is performed to transmit the blocking message.

4. The method of claim 1, wherein, when the server unit detects no hacking threat in step (c5), step (d) is performed to transmit the normal execution code.

5. The method of claim 1, wherein, when it is determined in step (c5) that the threat detection count is included in the preset access block value, step (d) is performed to transmit the blocking message.

6. The method of claim 1, wherein, when it is determined in step (c5) that the threat detection count is not included in the preset access block value, step (d) is performed to transmit the blocking message.

7. The method of claim 1, wherein step (d) comprises:

(d1) transmitting, by the server unit, the blocking message to the user terminal; and (d2) transmitting, by the server unit, the normal execution code to the user terminal.

8. The method of claim 7, wherein step (e) comprises:

(e1) receiving, by the user terminal, the blocking message or the normal execution code from the server unit; and (e2) determining whether the user terminal has received the normal execution code.

9. The method of claim 8, wherein, when it is determined in step (e2) that the user terminal has received the normal execution code, step (e) further comprises (e3) allowing access of the user terminal.

10. The method of claim 8, wherein, when it is determined in step (e2) that the user terminal has not received the normal execution code, step (e) further comprises (e4) outputting a threat detection message.

* * * * *